United States Patent
Vidmar et al.

[19]

[11] Patent Number: 5,913,781
[45] Date of Patent: Jun. 22, 1999

[54] LANDSCAPE TIMBER CONNECTING SYSTEM

[75] Inventors: James Vidmar, Willoughby; Peter Rimback, Village of Oakwood, both of Ohio

[73] Assignee: Hanover Catalog Holdings, Inc., Weehawken, N.J.

[21] Appl. No.: 08/657,812

[22] Filed: May 31, 1996

[51] Int. Cl.⁶ .................................................. E04B 1/38
[52] U.S. Cl. ...................... 52/102; 52/587.1; 52/590.2; 47/33; 403/316; 403/364; 403/381; 16/223; 16/262; 16/271; 16/DIG. 13
[58] Field of Search ......................... 52/102, 155, 587.1, 52/592.1, 592.2, 582.1, 582.2, 590.2, 591.4; 47/33; 256/26; 403/315, 316, 364, 381, 331; 16/223, 254, 260, 271, 262, 384, 225, DIG. 13, 365, 378

[56] References Cited

U.S. PATENT DOCUMENTS

| | | |
|---|---|---|
| 1,001,112 | 8/1911 | Wrikeman ................................. 16/271 |
| 1,015,584 | 1/1912 | Powell ..................................... 52/102 |
| 1,034,461 | 8/1912 | Johnson ................................... 256/26 |
| 2,691,242 | 10/1954 | Young ................................. 52/590.2 X |
| 2,732,597 | 1/1956 | Contratto ............................. 52/590.2 |
| 3,170,201 | 2/1965 | Nofziger ........................... 52/732.3 X |
| 3,343,301 | 9/1967 | Adelman ..................................... 47/33 |
| 3,537,687 | 11/1970 | Adelman . |
| 3,545,128 | 12/1970 | La Fontaine et al. . |
| 3,547,472 | 12/1970 | Ehrman ............................. 52/590.2 X |
| 3,916,563 | 11/1975 | Tedesh . |
| 4,930,753 | 6/1990 | Alvyn ....................................... 256/26 |
| 4,971,475 | 11/1990 | Castonguay et al. . |
| 5,119,587 | 6/1992 | Waltz ....................................... 47/33 |
| 5,168,678 | 12/1992 | Scott, Jr. et al. . |
| 5,230,187 | 7/1993 | Reimann . |
| 5,291,708 | 3/1994 | Johnson . |

FOREIGN PATENT DOCUMENTS

| | | | |
|---|---|---|---|
| 1381538 | 11/1964 | France ..................................... 256/26 |
| 1421937 | 11/1965 | France ....................................... 47/33 |
| 2630290 | 10/1989 | France ....................................... 47/33 |
| 610406 | 10/1960 | Italy ........................................... 47/33 |
| 867282 | 5/1961 | United Kingdom ....................... 47/33 |
| 2230928 | 11/1990 | United Kingdom ....................... 47/33 |

OTHER PUBLICATIONS

Jones, Thomas H., "A Woodworker's Guide to Joinery", MI, pp. 52–55, Sep. 1983.

*Primary Examiner*—Carl D. Friedman
*Assistant Examiner*—Laura A. Callo
*Attorney, Agent, or Firm*—Thompson Hine & Flory LLP

[57] ABSTRACT

A landscape timber connecting system for use with landscape timber or the like includes first and second interlocking members. The first and second members each have a bracket shaped to engage an end of a first landscape timber, and in a preferred embodiment, a hinge component. The hinge components are adapted to align with each other and form a channel along a common, substantially vertical pivot axis. A hinge pin shaped to be inserted in the channel along the common pivot axis and extend downwardly into ground beneath the system such that the first and second members can be pivotally positioned relative to each other about the common pivot axis to position associated engaged landscape timbers at a selected angle relative to each other, and the hinge pin anchors and fixes the system to the ground. In an alternate embodiment, the members slidably engage to form a straight, non-pivoting joint.

25 Claims, 13 Drawing Sheets

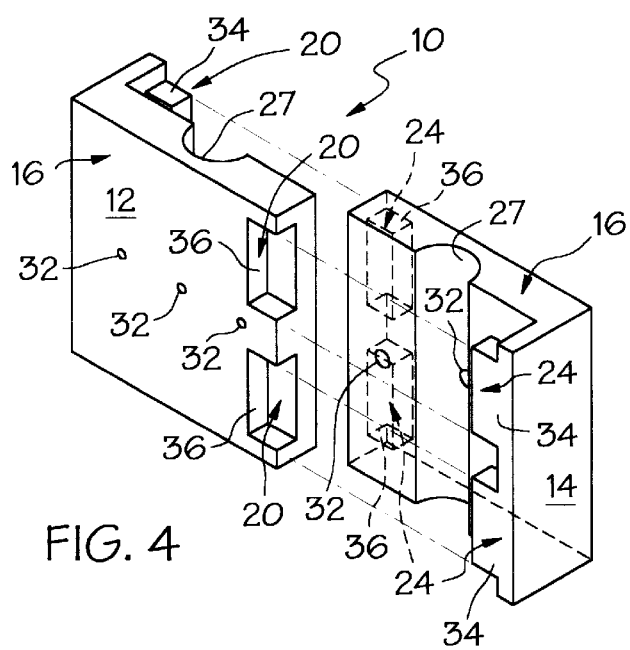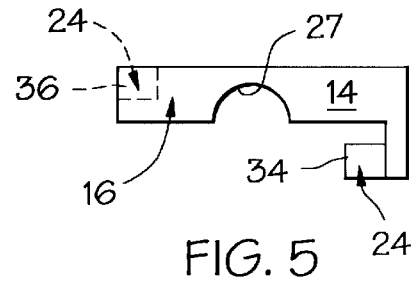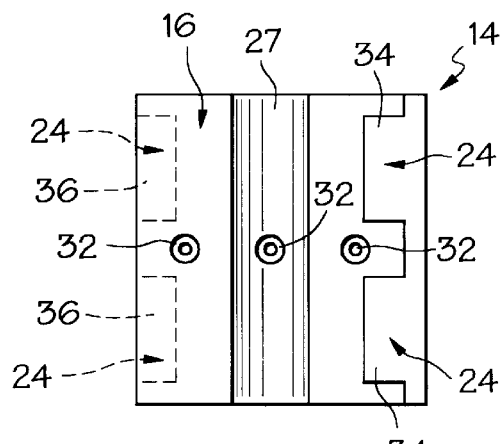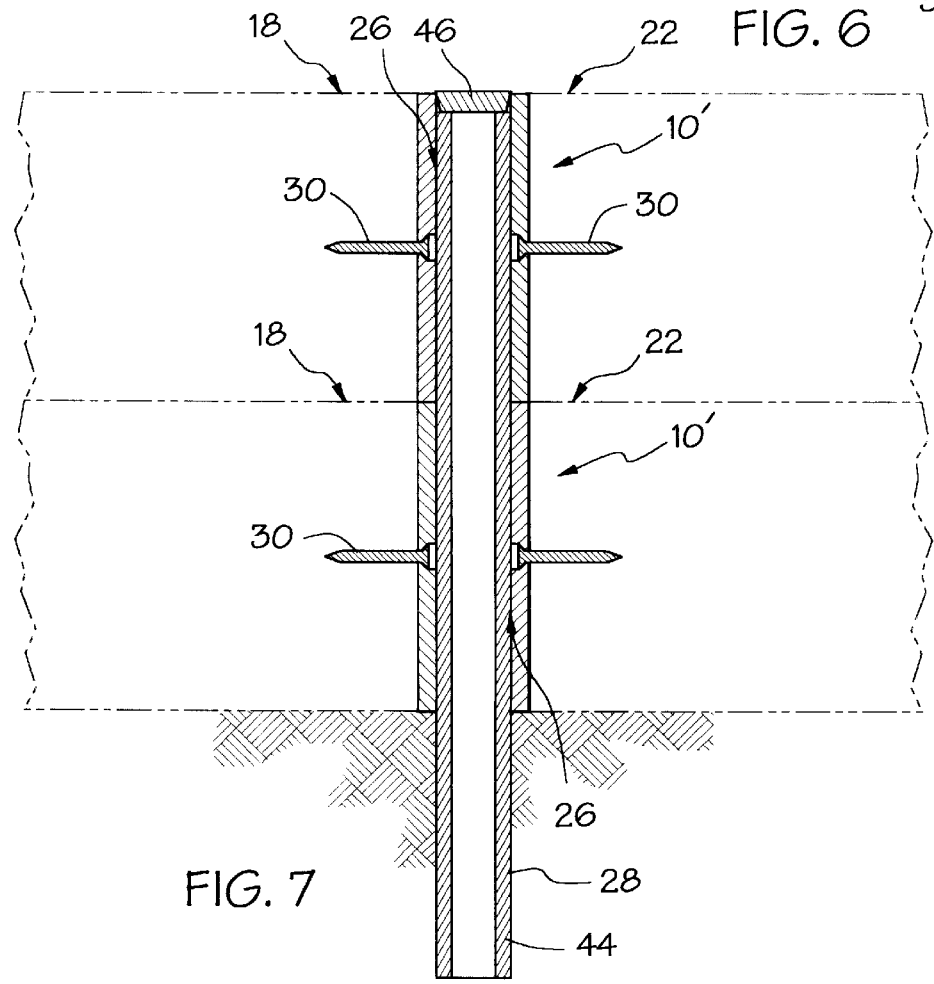

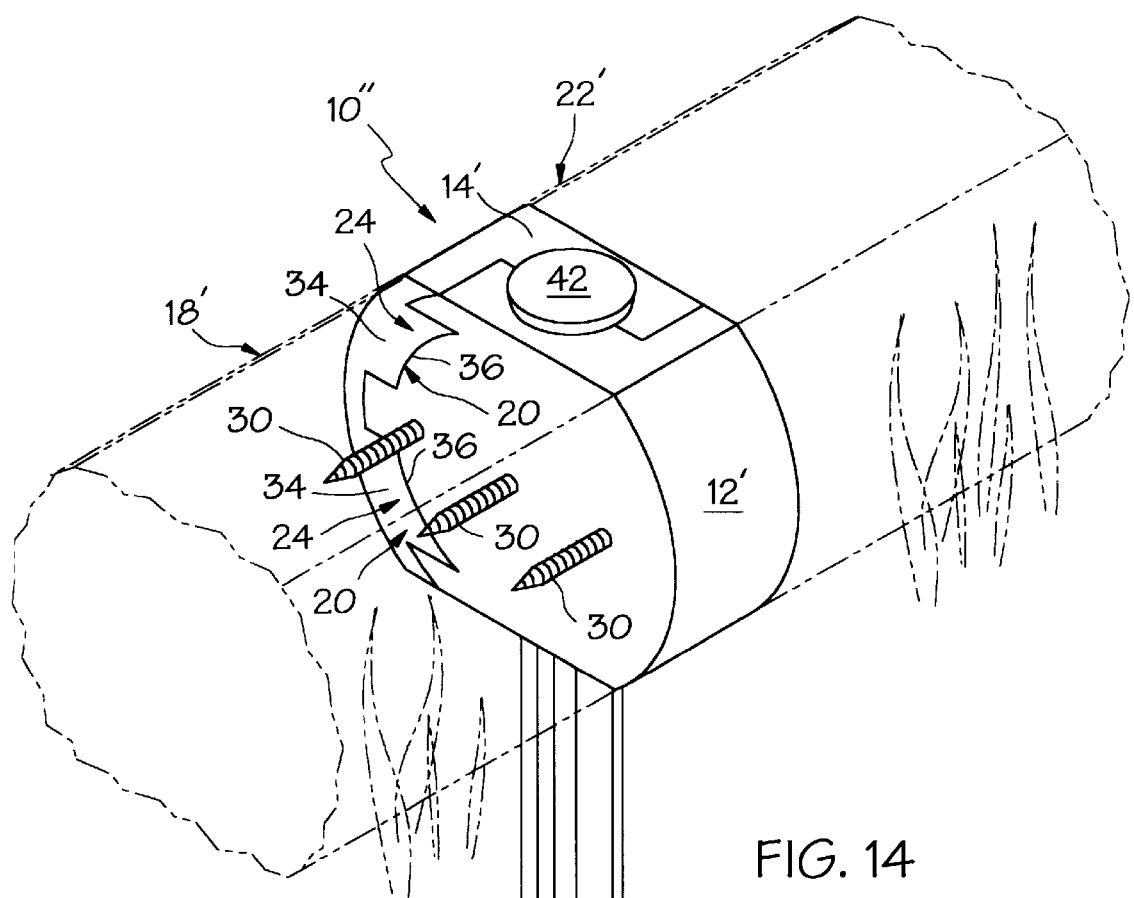
FIG. 14
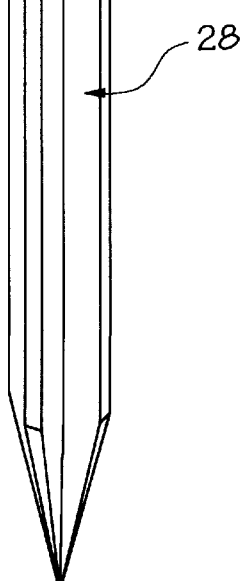

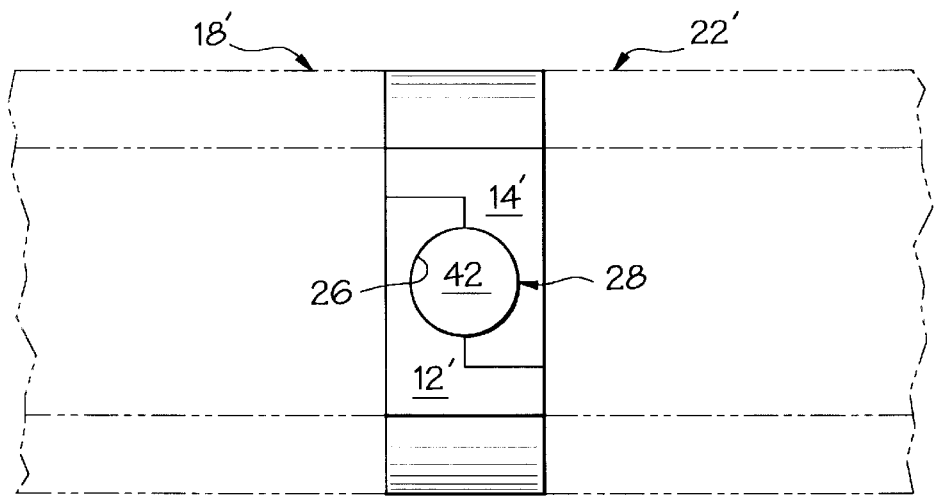
FIG. 15
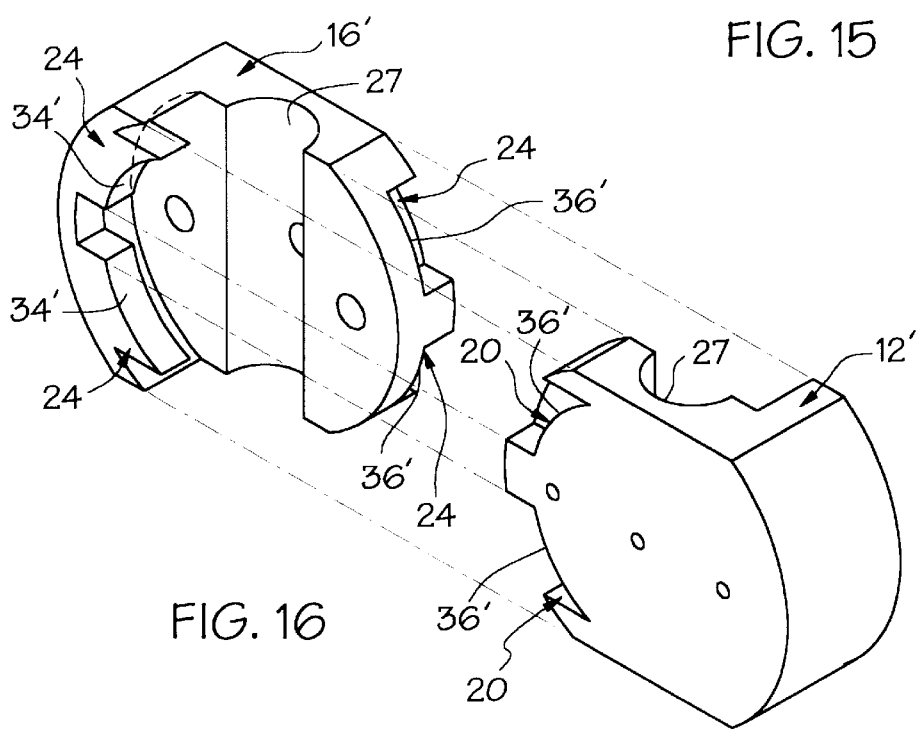
FIG. 16
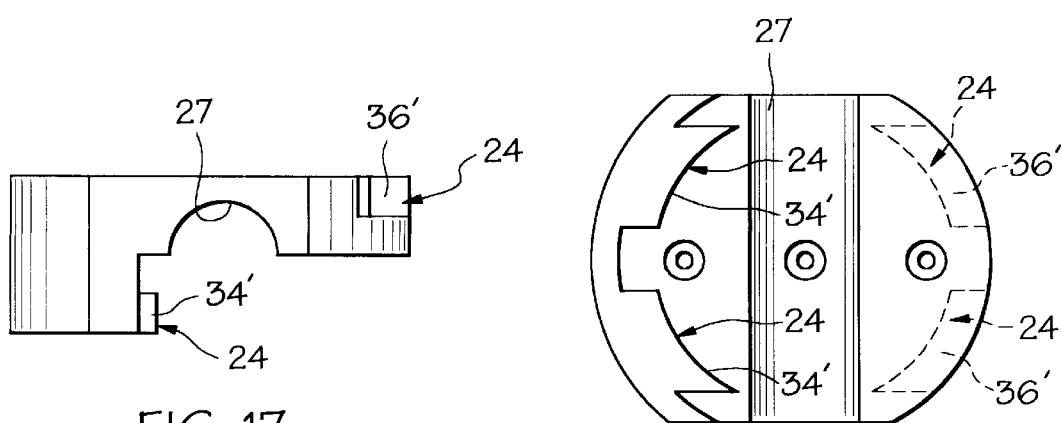
FIG. 17
FIG. 18

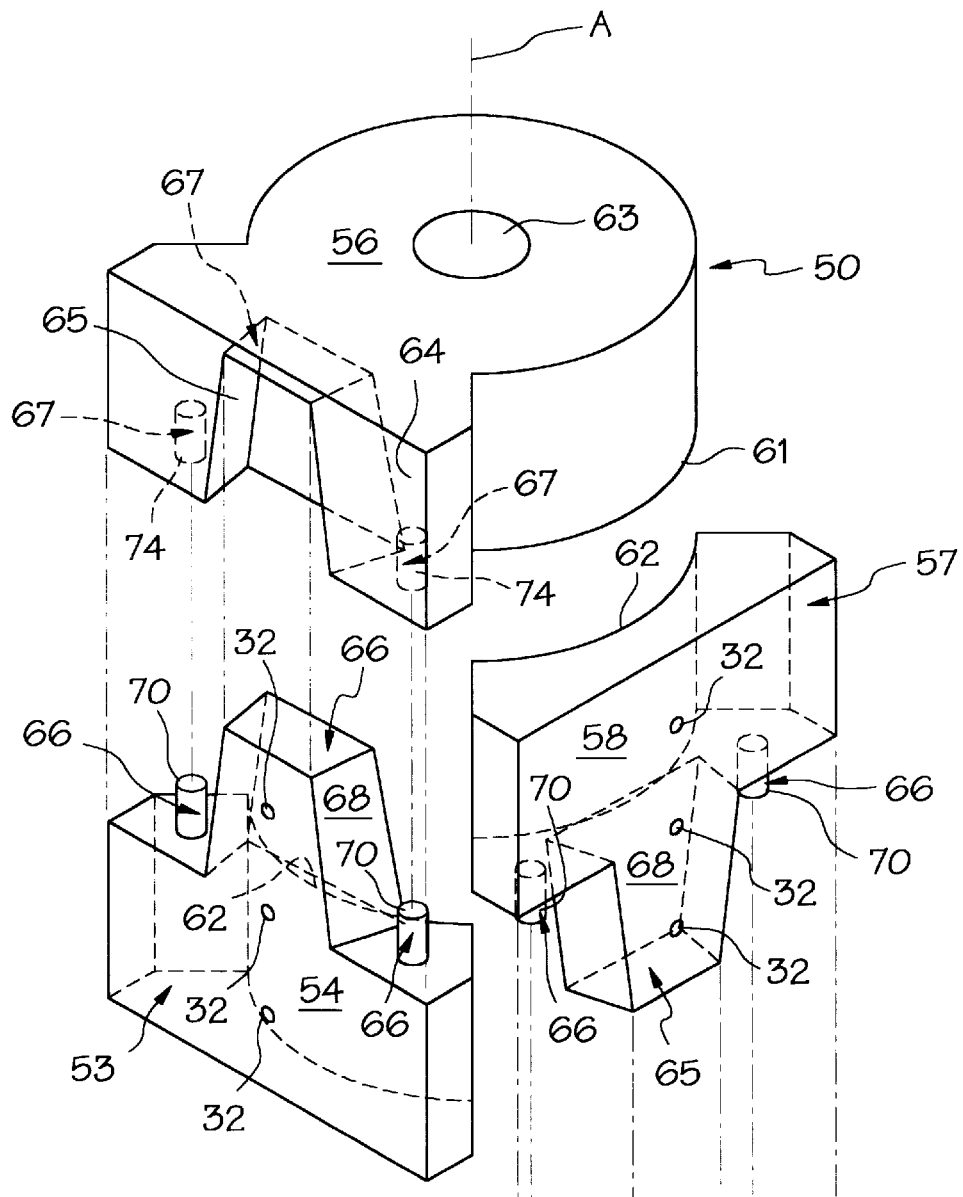
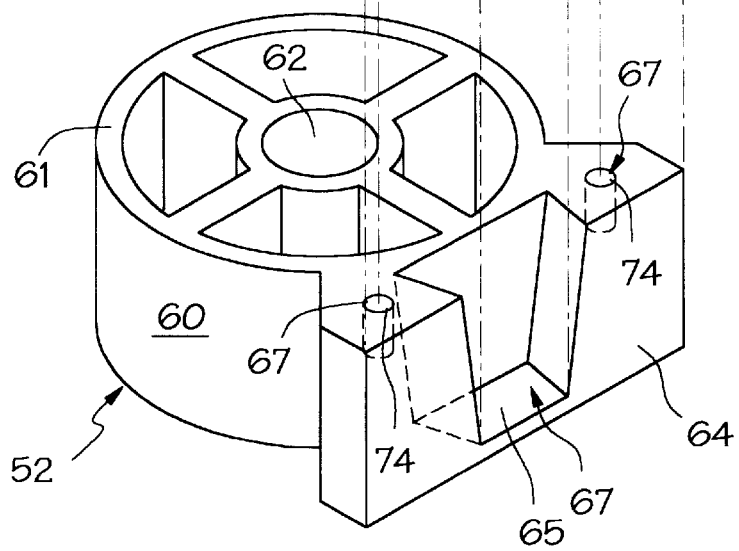
FIG. 25

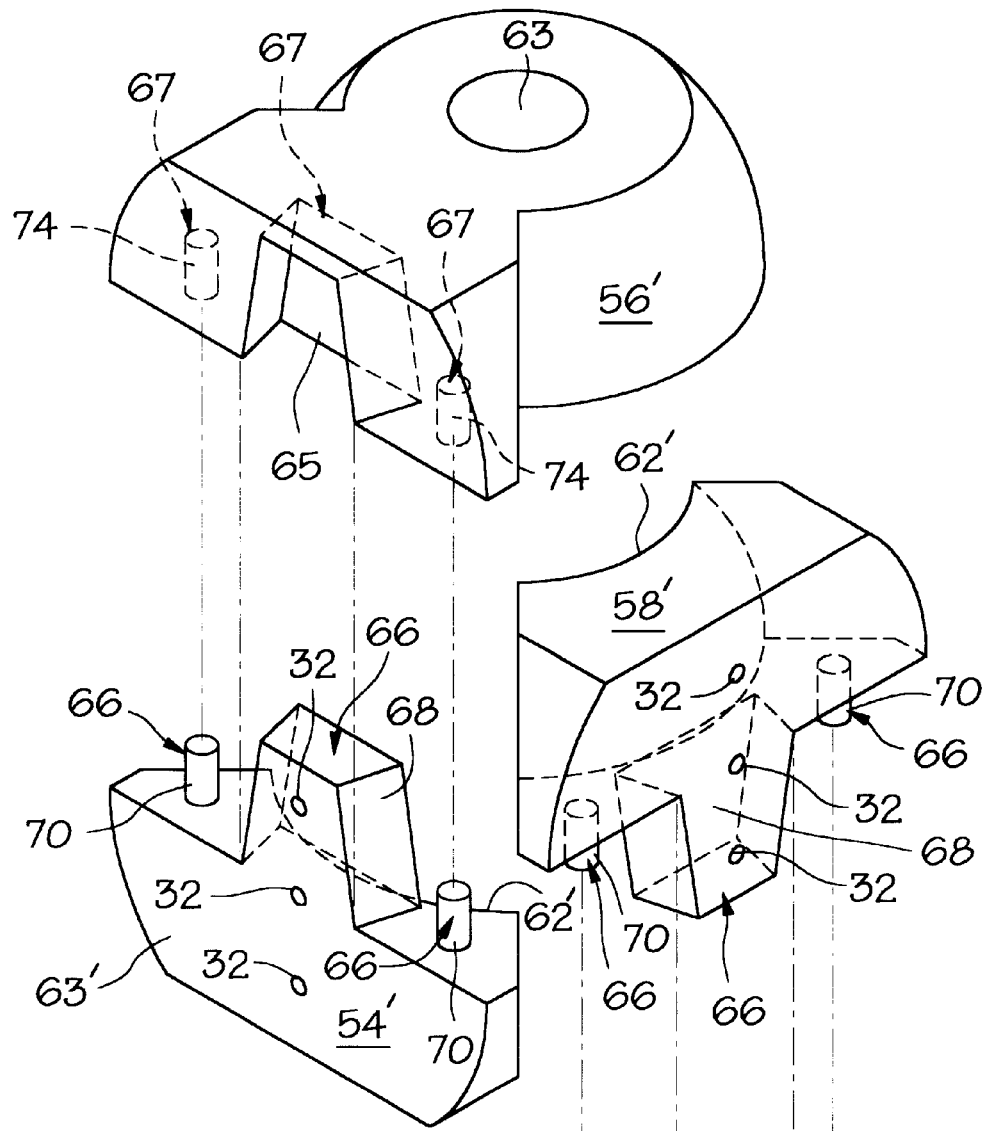
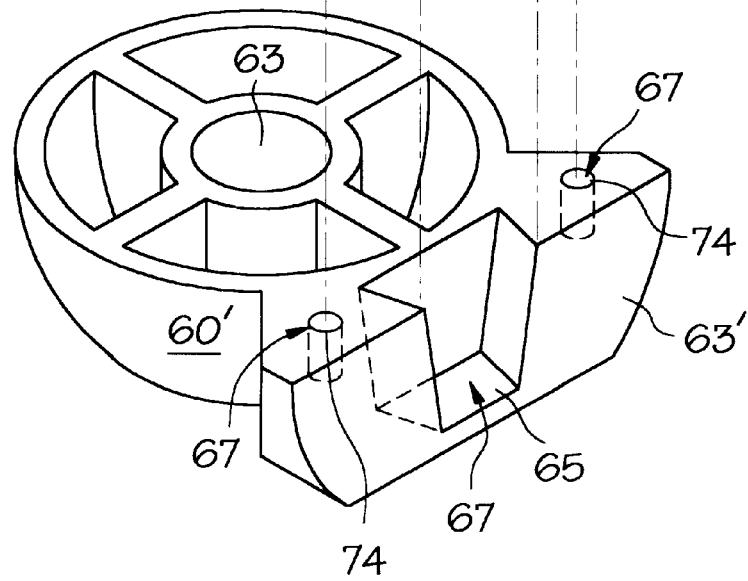
FIG. 27

5,913,781

LANDSCAPE TIMBER CONNECTING SYSTEM

BACKGROUND OF THE INVENTION

The present invention relates to landscape retaining wall systems, and more particularly, to retaining wall systems employing interconnected landscape timbers and the like.

A popular structure for use in landscaped areas is a retaining wall or border made of pressure treated lumber and the like. However, connecting two adjacent timbers has been problematic, especially for angular configurations such as borders that encircle a planting.

One attempt at solving this problem is disclosed in U.S. Pat. No. 5,291,708, which shows a modular framing system for use with landscape timber. The framing system includes a central spike having a plurality of slots, and at least two brackets that pivotally engage the slots. The brackets each are shaped to attach to landscape timbers, such as 2"×6" lumber. A disadvantage with that system is that it requires a specific angular formation to be preselected before assembling the components of the framing system. Accordingly, much time and effort is required to assemble that system.

Accordingly, there is a need for a landscape timber connecting system which is of simple construction, adjustable, relatively inexpensive, aesthetically pleasing and easy to assemble.

SUMMARY OF THE INVENTION

The present invention is a landscape timber connecting system which interconnects landscape timbers and includes means to anchor the connection to the ground. The anchor means is, in a preferred embodiment, a pin or stake that serves both to connect the timbers and secure the timbers to the ground.

The system employs two members shaped to be attached to ends of landscape timbers. The first member is fixed to an end of a first landscape timber, and includes a first mating component, and the second member is shaped to be fixed to an end of a second landscape timber, and includes a second mating component. The first and second mating components engage each other such that a substantially vertical channel is formed between the first and second members. The pin is inserted in the common channel and engages the members to fix them in position relative to each other. In one embodiment, the components interconnect to form a butt joint between timbers such that the timbers are aligned with each other in a substantially straight line.

In another embodiment of the present invention, the two members each include a hinge component. The hinge components pivotally engage each other and from a common, substantially vertical channel which coincides with a pivot axis. A hinge pin is inserted along the channel and into the ground such that the first and second members can be pivotally positioned relative to each other about the common pivot axis to position associated attached landscape timbers at a selected angle relative to each other.

Another feature of the invention is that, with each embodiment, the members are shaped to interconnect and be locked together by the pin. With the embodiment forming a straight joint, the members engage each other such that relative slidable movement only is permitted, but such sliding movement is prevented by inserting the pin in the channel.

Each of the two aforementioned embodiments can be varied in shape or contour to match the profile of the associated landscape timber. For example, if the associated timber is square or rectangular in shape, the connecting members, both for a straight joint and a pivot joint, can be square or rectangular in shape, thereby providing a smooth, uniform appearance. In the alternative, if the timbers have curved side walls, the connecting members of the invention have similarly curved shapes.

Accordingly, it is an object of the present invention to provide a landscape timber connecting system for use with landscape timber or the like; a landscape timber connecting system for quick, aesthetically pleasing joining of two or more landscape timbers; a landscape timber connecting system capable of stacking such that two or more systems with their respective landscape timbers can be stacked forming a wall-like structure; a landscape timber connecting system that permits various shapes of perimeters to be formed along and around areas, such as flower beds and the like; a landscape timber connecting system that permits free rotation of connected landscape timber around a common pivot axis; and a landscape timber connecting system that is relatively inexpensive; permits quick and easy changes in the angles formed by the landscape timber connecting system; and takes a minimal amount of effort and time.

BRIEF DESCRIPTION OF THE DRAWINGS

FIG. 4 is an exploded, perspective view of the landscape timber connecting system of FIG. 1, shown without the pin;

FIG. 5 is a top plan view of one member of the landscape timber connecting system of FIG. 1;

FIG. 6 is a front elevational view of one member of the landscape timber connecting system of FIG. 1;

FIG. 7 is an elevational in section showing two of the landscape timber connecting systems of FIG. 2 stacked;

FIG. 14 is a perspective view of a third preferred embodiment of a landscape timber connecting system of the present invention, shown connected to landscape timbers illustrated in phantom;

FIG. 15 is a top plan view of the landscape timber connecting system of FIG. 14;

FIG. 16 is an exploded, perspective view of the landscape timber connecting system of FIG. 14, shown without the pin;

FIG. 17 is a top elevational view of one member of the landscape timber connecting system of FIG. 14;

FIG. 18 is a front elevational view of one member of the landscape timber connecting system of FIG. 14;

FIG. 25 is an exploded, perspective view of the landscape timber connecting system of FIG. 24, without the pin;

FIG. 27 is an exploded, perspective view of the landscape timber connecting system of FIG. 26, shown without the pin.

DETAILED DESCRIPTION

Figure 1:
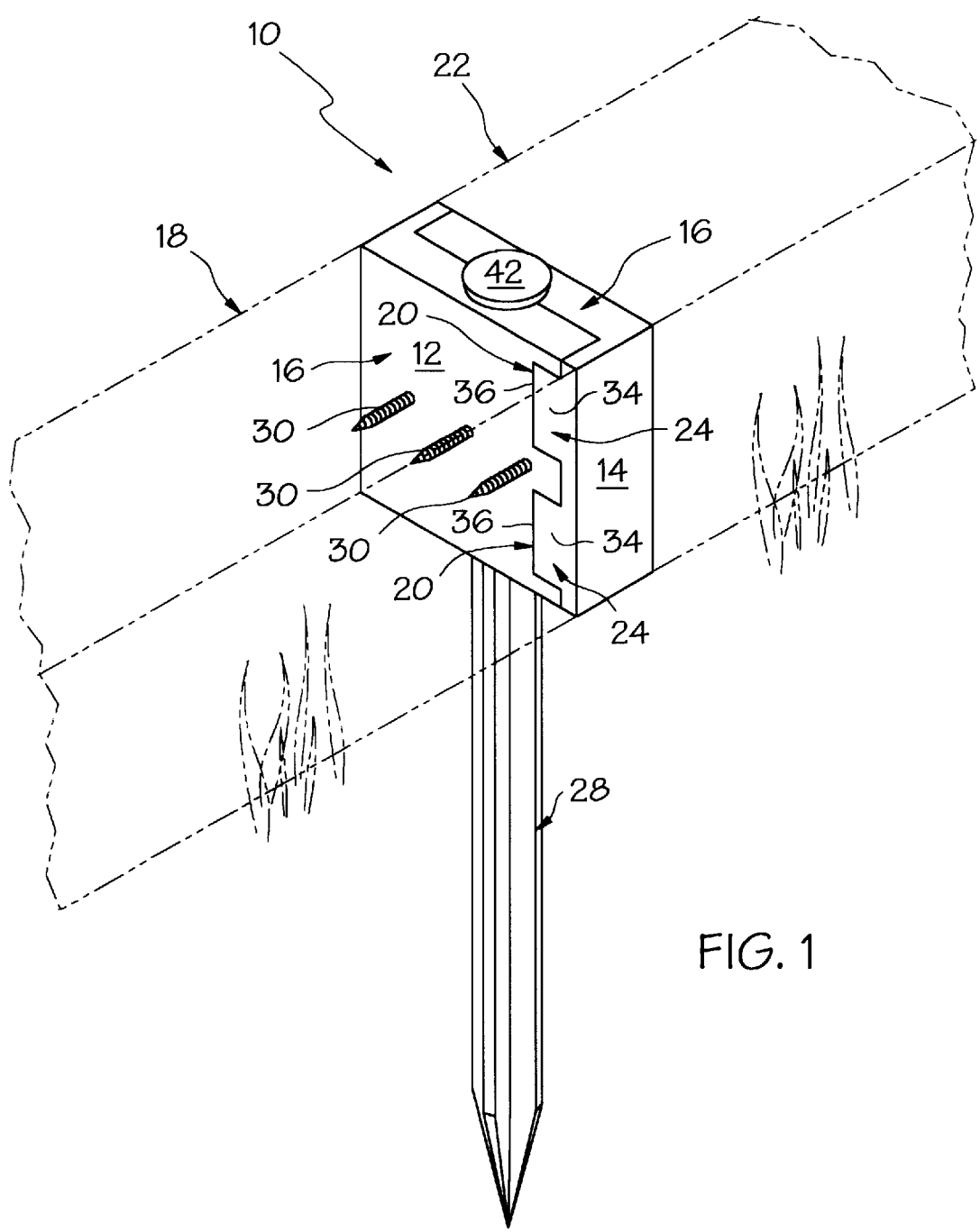
FIG. 1 is a perspective view of a preferred embodiment of a landscape timber connecting system of the present invention, shown connected to landscape timbers illustrated in phantom.
Figure 2:
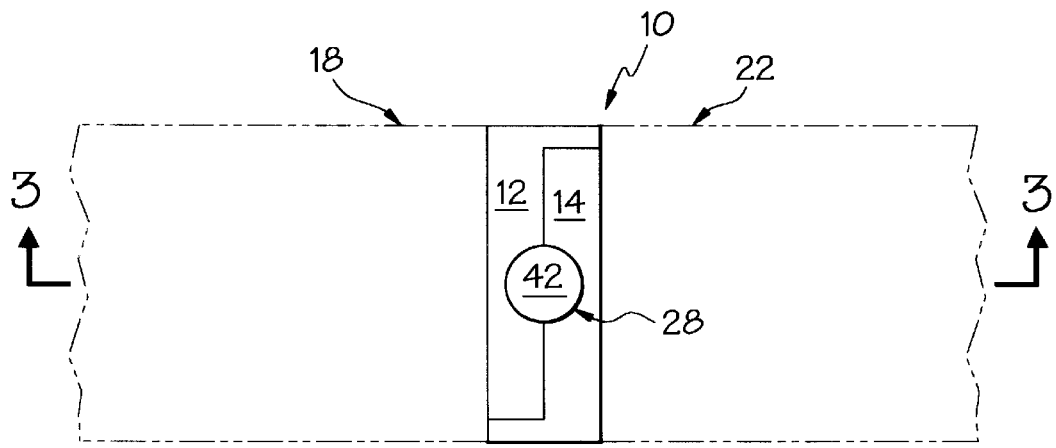
FIG. 2 is a top plan view of the landscape timber connecting system of FIG. 1.
Figure 3:
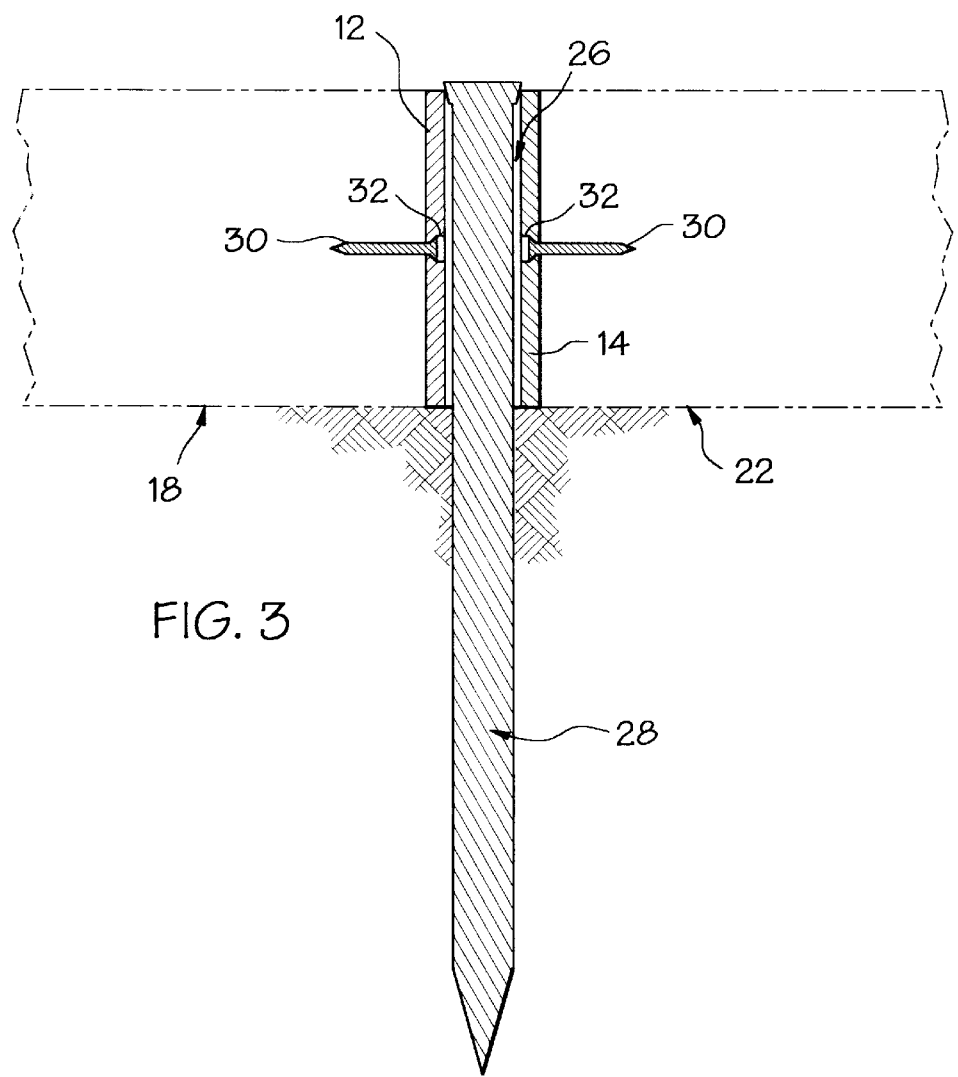
FIG. 3 is a an elevational view in section of the landscape timber connecting system taken at line 3—3 of FIG. 2.
Figure 8:
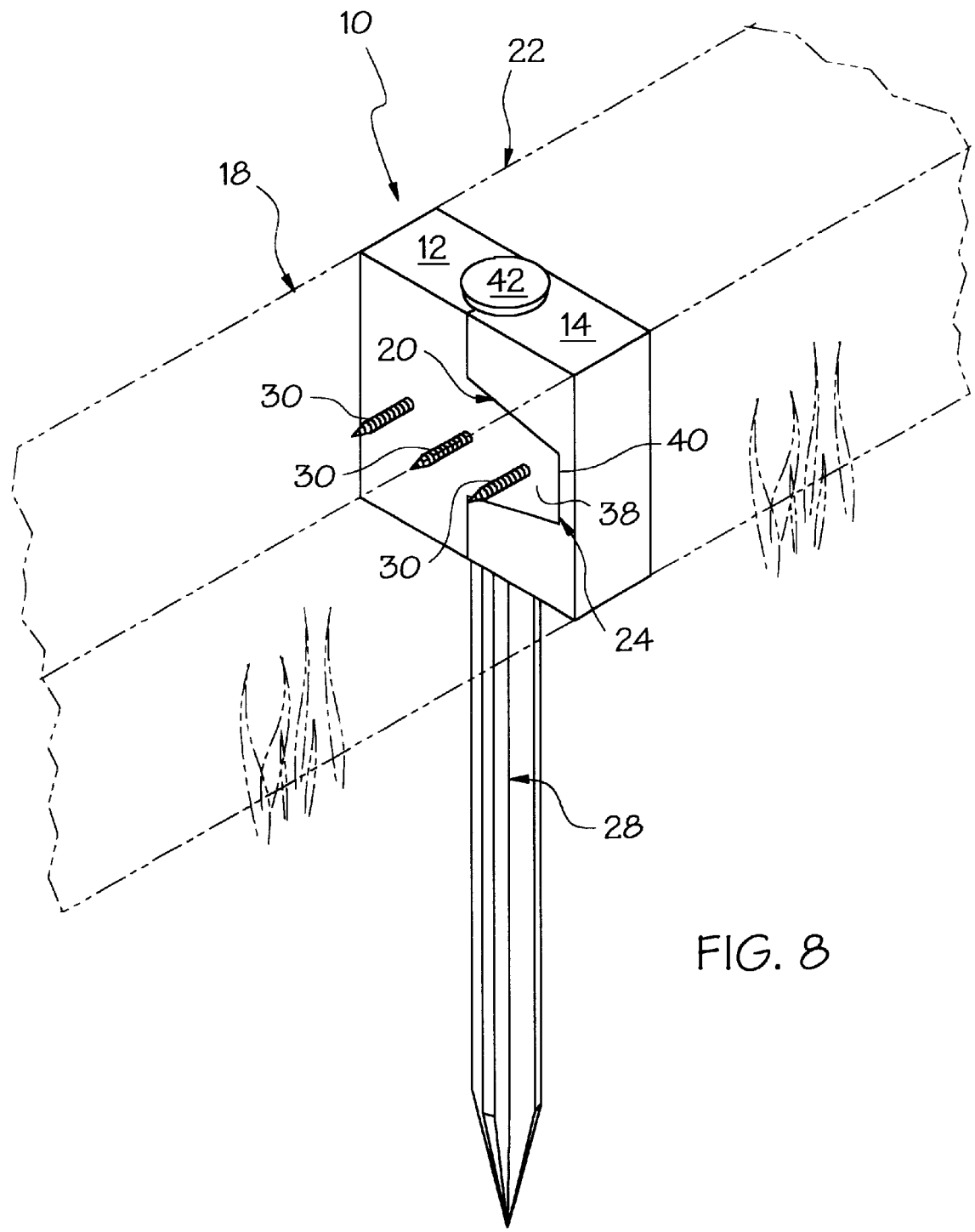
FIG. 8 is a perspective view of a second preferred embodiment of a landscape timber connecting system of the present invention, shown connected to landscape timbers illustrated in phantom.

As shown in FIGS. 1, 2 and 3, in accordance with one preferred embodiment of the present invention, a landscape timber connecting system, generally designated 10, includes first and second interlocking members 12, 14 which preferably are substantially identical in shape. As best shown in FIGS. 4, 5 and 6, the first member 12 includes a body 16 shaped to be attached to an end of landscape timber 18, and includes a first mating component, generally designated 20. Similarly, the second member 14 is shaped to be attached to an end of landscape timber 22, and includes a second mating component, generally designated 24.

The second mating component 24 is adapted to engage the first mating component 20 such that relative sideward movement only is permitted. The components 20, 24 together form a common, substantially vertical channel, generally designated 26 (see FIGS. 3 and 7). As shown in FIGS. 4 and 5, the body 16 of each of the members 12, 14 includes a semi-cylindrical channel segment 27. When the members 12, 14 are assembled as shown in FIGS. 1 and 2, the channel segments 27 combine to form the channel 26. A pin, generally designated 28, is shaped to be inserted into the channel 26 and engage and lock together the first and second members 12 and 14. Once the pin 28 is inserted into the channel 26, the members are prevented from sliding sidewardly relative to each other because the pin prevents the channel segments 27 from separating sidewardly from a position of direct opposition to each other.

The first and second members 12, 14 each include means for attachment to the ends of the landscape timbers, 18, 22. The means for attachment can include any suitable means such as screws, nails, weatherproof adhesives and the like, or combinations thereof. The means for attachment shown in FIGS. 1, 2 and 3 is three screws inserted through screw holes 32 formed in members 12, 14.

In the embodiment shown in FIGS. 1–7, the first and second mating components 20, 24 each include sidewardly-projecting fingers 34 and rabbeted slots 36 formed in the body 16. The slots 36 of each of the components 20, 24 are shaped to receive the fingers 34 of the other component.

Figure 9:
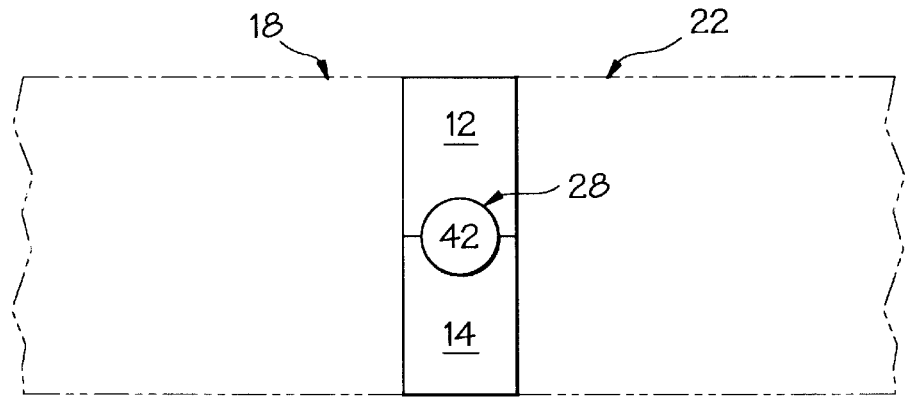
FIG. 9 is a top plan view of the landscape timber connecting system of FIG. 8.
Figure 10:
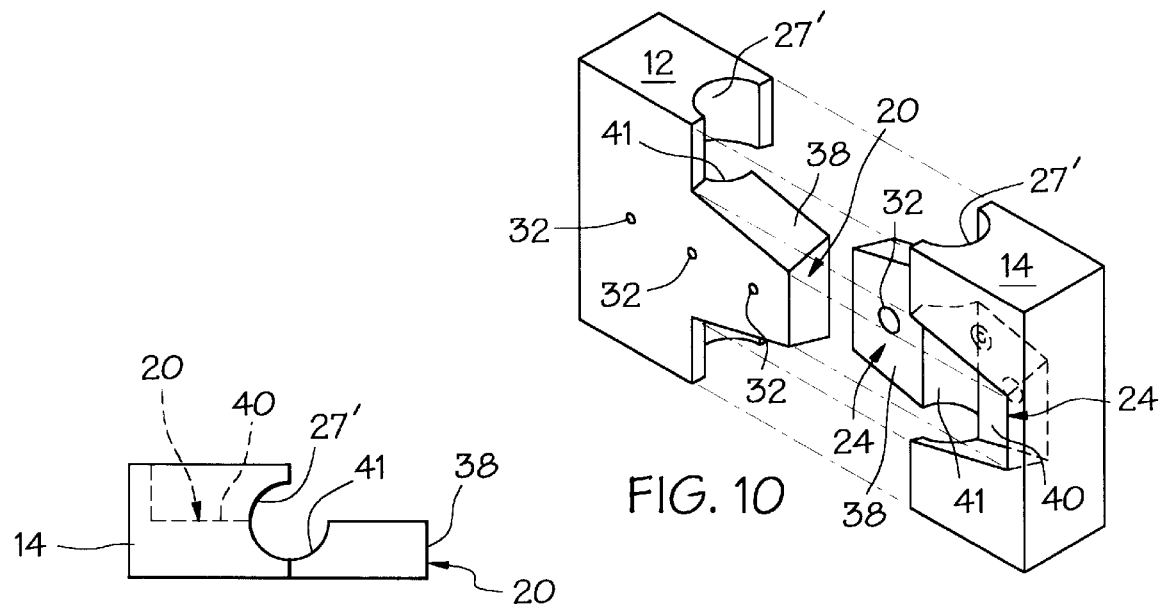
FIG. 10 is an exploded, perspective view of the landscape timber connecting system of FIG. 8, shown without the pin.
Figure 11:
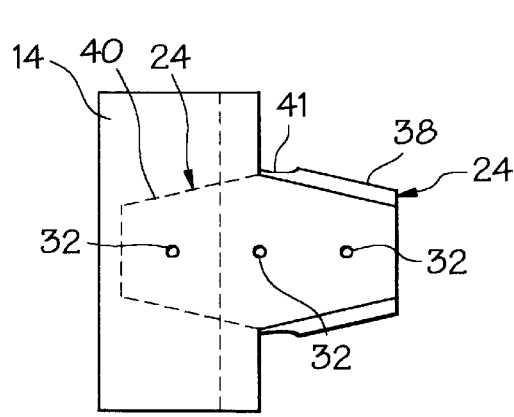
FIG. 11 is a top plan view of one member of the landscape timber connecting system of FIG. 8.
Figures 12, 13:
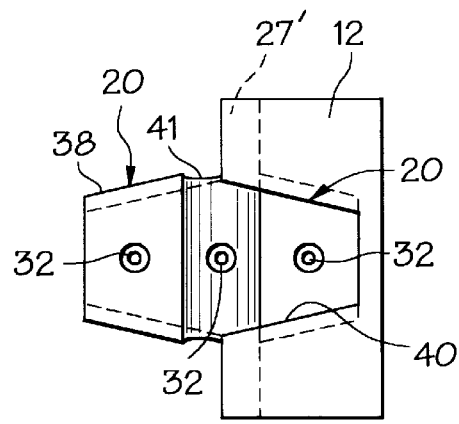
FIG. 12 is a front elevational view of one member of the landscape timber connecting system of FIG. 8.
FIG. 13 is a front elevational view of the other member of the landscape timber connecting system of FIG. 8.
Figure 19:
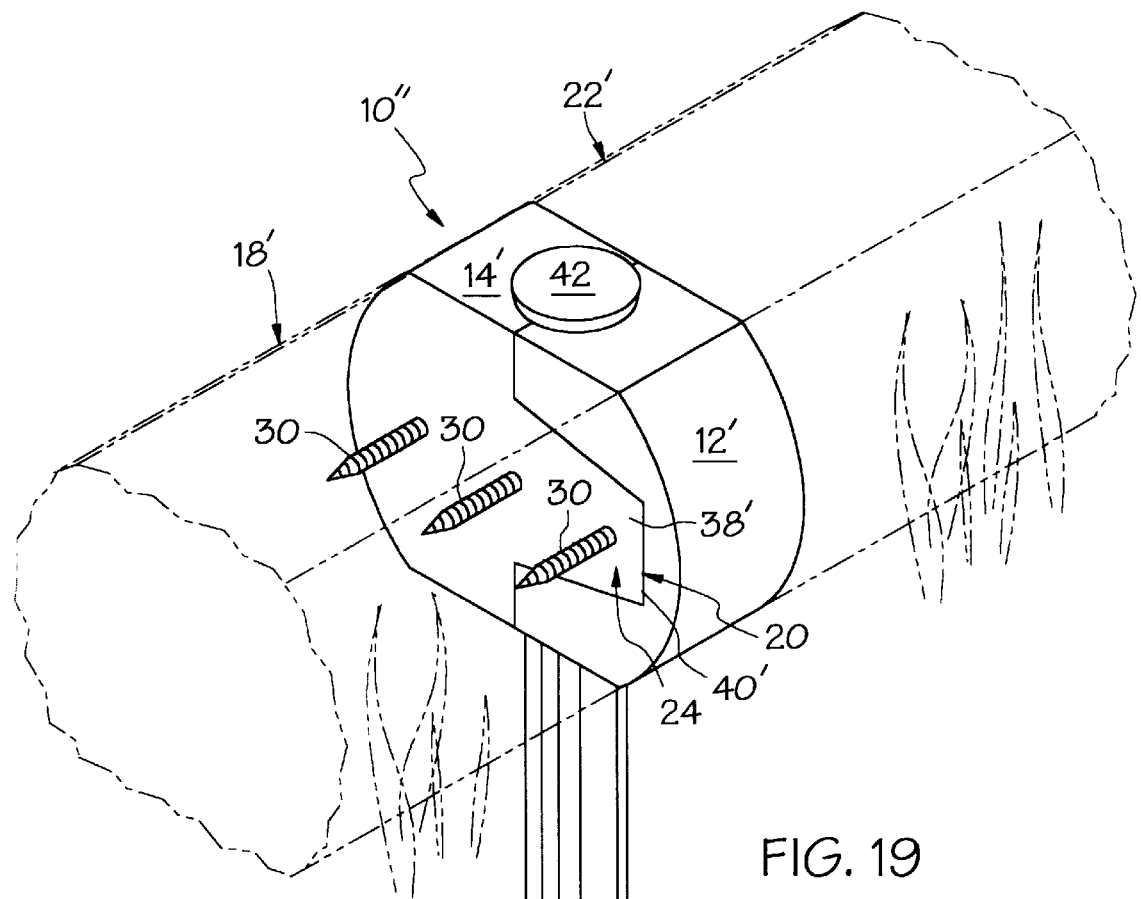
FIG. 19 is a perspective view of a fourth preferred embodiment of a landscape timber connecting system of the present invention, shown connected to landscape timbers illustrated in phantom.
Figure 20:
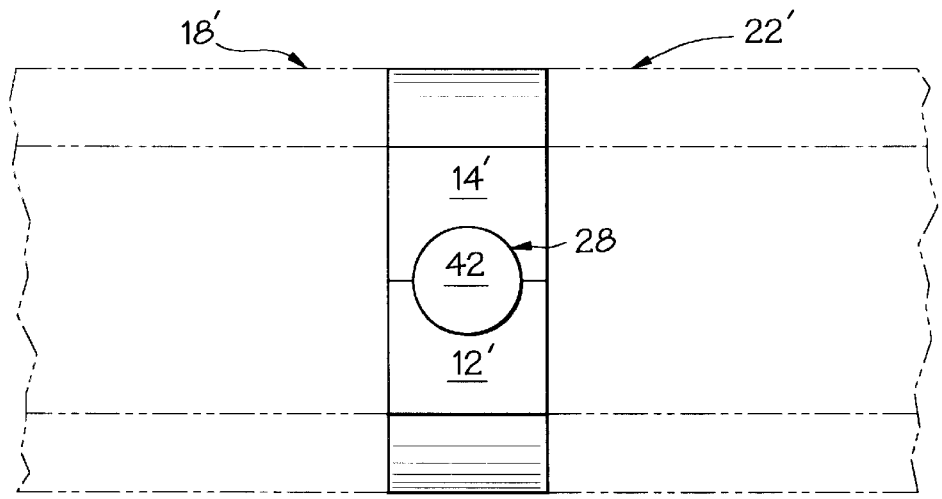
FIG. 20 is a top plan view of the landscape timber connecting system of FIG. 19.
Figure 21:
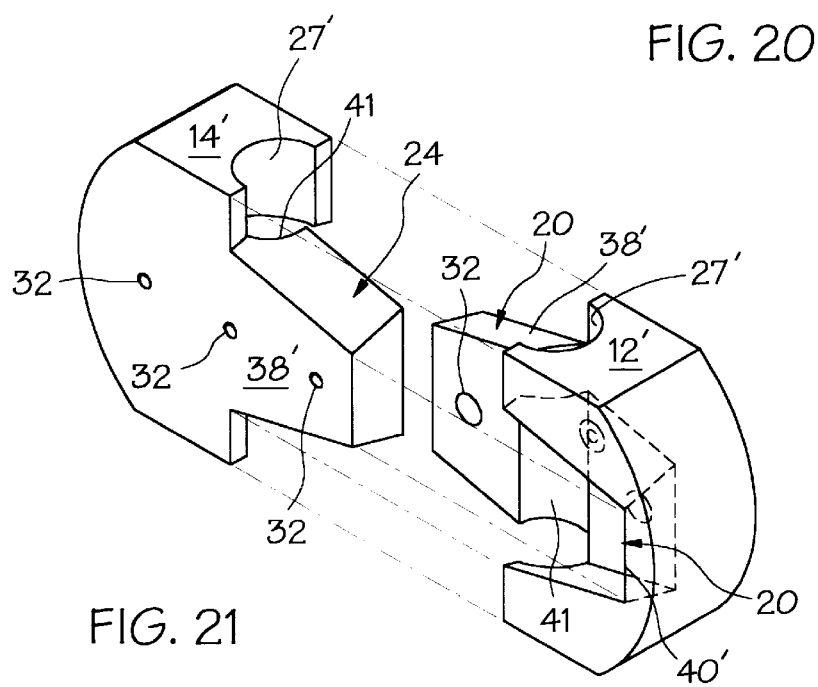
FIG. 21 is an exploded, perspective view of the landscape timber connecting system of FIG. 19, shown without the pin.
Figure 22:
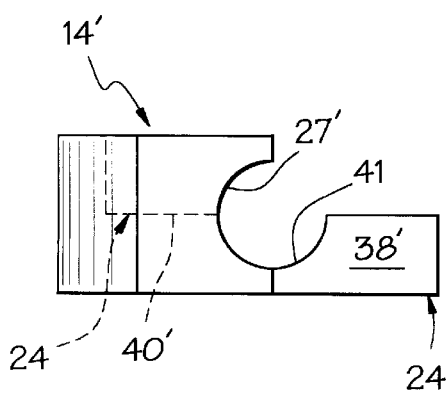
FIG. 22 is a top plan view of one member of the landscape timber connecting system of FIG. 19.
Figure 23:
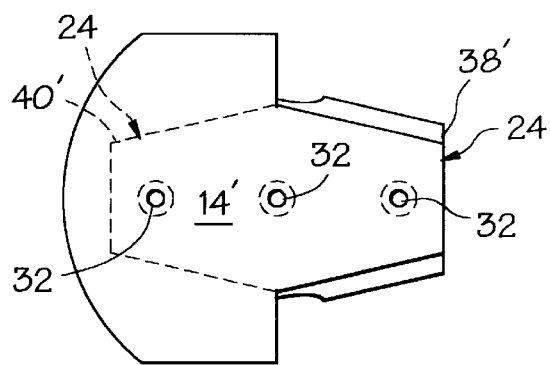
FIG. 23 is a front elevational view of one member of the landscape timber connecting system of FIG. 19.

In the embodiment of the invention shown in FIGS. 8–13, the first and second mating components 20, 24 each include tapered dovetail pins 38 and tapered dovetail slots 40. The dovetail slots 40 of the components 20, 24 are shaped to receive the corresponding dovetail pins 38 of the components. The beveled shapes of the pins 38 and slots 40 provide a locking function that restricts movement of the components 20, 24 to relative lateral movement when the pins and slots are engaged. The semi-cylindrical segments 27' include cylindrical cutouts 41 formed in the dovetail pins 38. Consequently, when the components are assembled as shown in FIG. 9, the pin 28 performs a locking function because, when the pin is inserted in the channel 26 formed by segments 27 and cutouts 41, the components 12, 14 are prevented from sliding sidewardly relative to each other by engagement between the pin 28 and the cutouts 41.

As shown in FIGS. 14–18, in a second alternate embodiment of the invention, the first and second members, 12' and 14', respectively, are shaped to be attached to the ends of rounded landscape timbers, 18', 22', respectively. The first and second mating components, 20, 24 each include sidewardly projecting fingers 34' and rabbeted slots 36', shaped such that the slots receive the fingers. The body 16' of each of the components members 12', 14' includes a semi-cylindrical channel segment 27 that cooperates to form a channel 26 to receive pin 28. Again, the pin 28 performs a locking feature which prevents relative sliding movement between the components 20, 24.

In a third alternate embodiment shown in FIGS. 19–23, the first and second mating components, 20, 24 are also rounded to fit with rounded timbers 18', 22' and include tapered dovetail pins 38' and tapered dovetail slots 40', shaped such that the dovetail slots receive the dovetail pins. The structure and function of the dovetail pins 38, dovetail slots 40, semi-cylindrical segments 27 and cutouts 41 is the same as for the embodiment of FIGS. 8–13.

The pin 28 is preferably adapted to extend downwardly into the ground beneath the system 10 such that the pin 28 anchors and fixes the system 10 to the ground, as shown in FIGS. 1, 3, 7, 8, 14 and 19. Preferably, the pin 28 is substantially flush with the first and second members, 12 and 14, respectively, after the pin 28 has completely engaged the channel 26 of the system 10. The pin 28 is usually in the form of a stake, as shown in FIGS. 1–3, 8, 9, 14, 15, 19, and 20, when only one system 10 is to be anchored and fixed to the ground.

When more than one level of system 10 is to be used (i.e. two or more systems stacked on top of one another) then the pin 28 is in the form of a pipe 44, as shown in FIG. 7, which can extend through the multiple channels 26 of more than one system 10 and downwardly into the ground beneath the systems 10 such that the pipe 44 anchors and fixes the stacked systems 10' to the ground. When the pin 28 is in the pipe 44 configuration, exposed excess pipe 44 is preferably cut such that the cut end of the pipe 44 is substantially flush with the top of the channel 26 formed by the stacked systems 10'. More preferably, a cap plug 46 is provided to fill the opening left in the pipe 44 after the pipe 44 has been cut. The pipe 44 can made from any suitable material, preferably galvanized metal.

Figure 24:
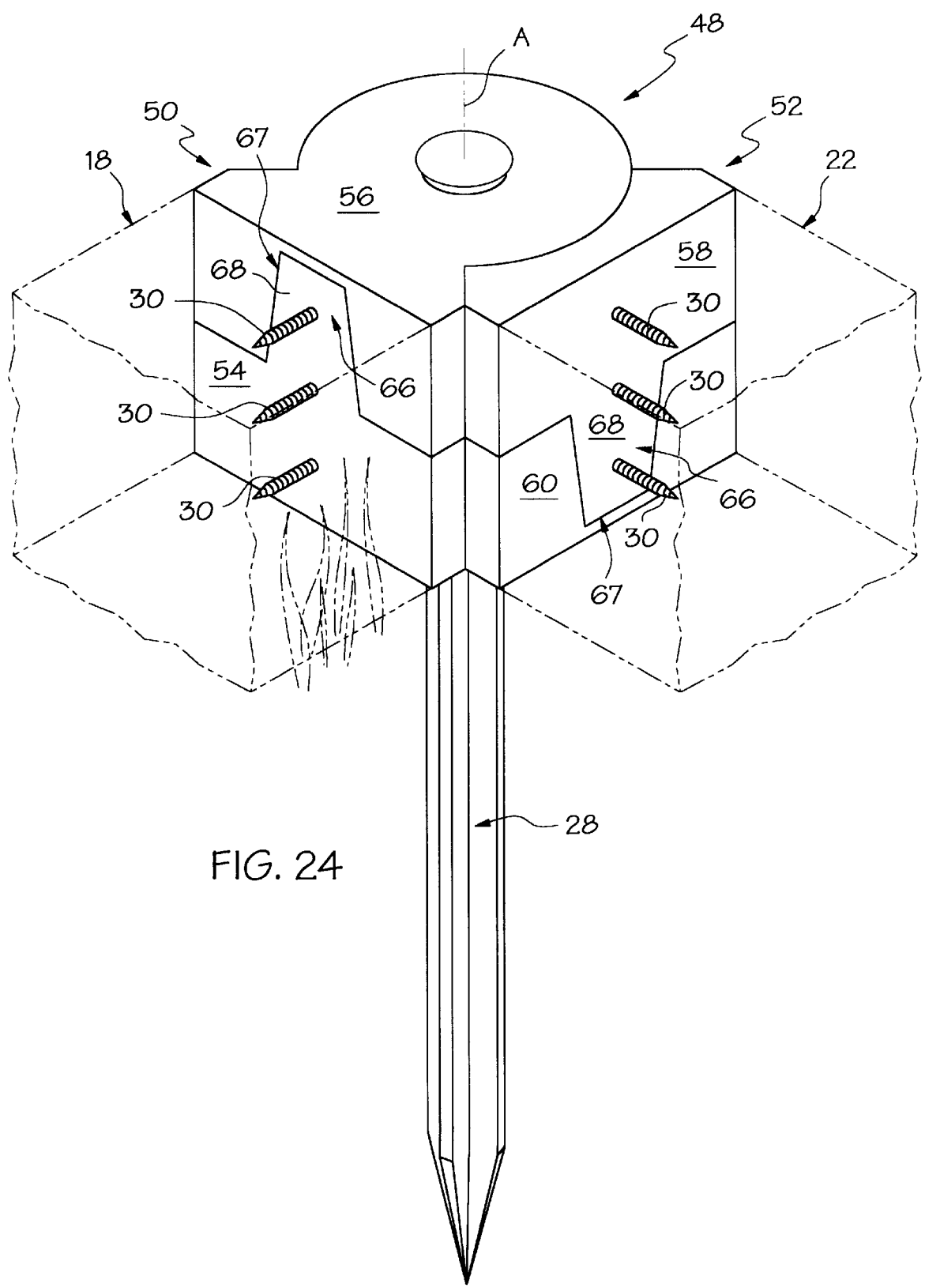
FIG. 24 is a perspective view of a fifth preferred embodiment of a landscape timber connecting system of the present invention, shown connected to landscape timbers illustrated in phantom.

As shown in FIGS. 24–25, in a fourth embodiment of the invention, a landscape timber connecting system, generally designated 48, includes a first member, generally designated 50, and a second member, generally designated 52, which are substantially identical in configuration. The first member 50 includes a mounting block 53 having a first substantially flat mounting surface 54 shaped to be attached to an end of a first landscape timber 18, and a first hinge component 56. Similarly, the second member 52 includes a mounting block 57 having a second substantially flat mounting surface 58 shaped to be attached to an end of a second landscape timber 22, and a second hinge component 60. The second hinge component 60 is adapted to engage the first hinge component 56 along inner surfaces 61 and together define a common, substantially vertical pivot axis A. The blocks 57 each include an arcuate cutout 62 shaped to provide clearance for the cylindrical body of the hinge components 56, 60. A hinge pin, generally designated 28, preferably a stake, is shaped to engage the first and second hinge components 56, 60 along the common pivot axis A such that the first and second members 50, 52 can be pivotally positioned relative to each other about the common pivot axis to position associated engaged landscape timbers 18 and 22 at a selected angle relative to each other to make an enclosure or angular border.

The mounting surfaces 54, 58 are attached to the ends of their respective landscape timbers 18, 22 by screws 30 which are inserted through holes 32 formed in the mounting surface. Alternate means for attaching the components 56, 60 to timbers 18, 22 includes nails, glue, and the like, or combinations thereof.

As best shown in FIG. 25, the first and second hinge components 56, 60 include a substantially vertical channel segment 63 through which the hinge pin 28 (FIG. 24) is inserted to interconnect the members 50, 52. The components 56, 60 are generally cylindrical in shape and each includes a flat mounting surface 64 and a tapered dovetail slot 65. For ease of manufacturing and attaching the first and second members 50, 52 to the ends of their respective landscape timbers 18, 22, the mounting surface 54, 58 and the hinge components 56, 60 are separate pieces. The mounting surfaces 54, 58 each include first mating components, generally designated 66, and the associated hinge components 56, 60 include second mating components, generally designated 66. The mounting surfaces 54, 58 combine in a manner hereafter described with the hinge components 56, 60 to form members 50, 52, respectively.

The first component 65 includes a tapered dovetail pin 68 and a pair of dowel pins 70. Similarly, the second component 66 includes the dovetail slot 64 and dowel pin holes 84, so that the dovetail slot receives the dovetail pin 68 and the dowel pin holes 74 receive the dowel pins 70. The engagement of the dovetail pins and slots 68, 64 and dowel pins 70 and holes 84 constrains the mounting surface 54 58 to relative sideward movement with respect to hinge components 56, 60.

Figure 26:
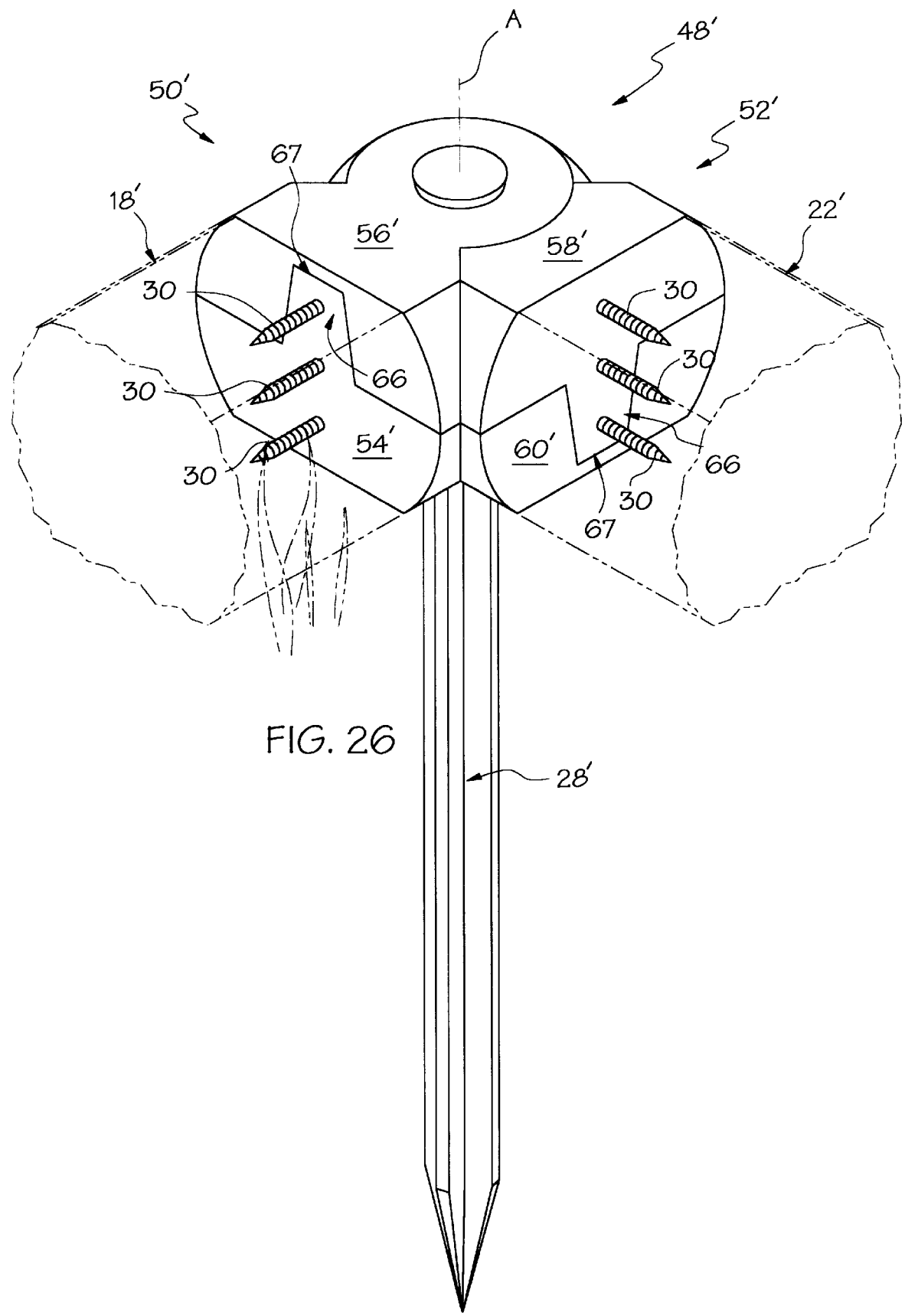
FIG. 26 is a perspective view of a sixth preferred alternate embodiment of a landscape timber connecting system of the present invention, shown connected to landscape timbers illustrated in phantom.

In the embodiment of the invention shown in FIGS. 24 and 25, the mounting surfaces 54, 58 are shaped to be mounted on the ends of 4"×4" landscape timbers 18, 22. In a fifth alternate embodiment of the invention, shown in FIGS. 26 and 27, the landscape timber connecting system 48' includes first and second members, 50', 52' formed by first and second mounting surfaces 54', 58' and first and second hinge components 56', 60'. These components 50', 52', 54', 58 mount flush with ends of rounded landscape timbers 18', 22'. The embodiment of FIGS. 26 and 27 is otherwise substantially identical in construction and function to the embodiment of FIGS. 24 and 25. The most notable difference is that the hinge components 56', 60', as well as the cutouts 62', are spherical in shape.

The first and second members 50, 52 are freely rotatable about the common pivot axis A, generally concentric with the channel 63, such that the components 50', 52' can be positioned to form any angle in the range of about 90° to about 180°. Changing the angle is accomplished easily because the hinge components 56, 60 of the first and second members 50, 52 are aligned along the pivot axis A. Accordingly, the landscape timber connecting system 48 can be used to create perimeters of any shape, including rectangular, octagonal, trapezoidal and irregular shapes. In practice, landscape timber can be supported between two landscape timber connecting systems 48. For example, one end of a landscape timber may be connected to the first member 50 of one landscape timber connecting system 48 and the other end of the landscape timber is connected to the second member 52 of another landscape timber connecting system 48. Preferably, the first mounting surface 54 is adapted to slidably mate with the second hinge component 60 about the second hinge component's outer periphery and the second attaching portion 58 is adapted to slidably mate with the first hinge component 56 about the first hinge component's outer periphery.

The first and second members and the stake or pin of the present invention may be made of any suitable material, preferably a suitable plastic material. More preferably, the material is high density polyethylene. Preferably, the members and the stake are made by an injection molding process.

Those skilled in the art will appreciate that other materials may be used to make the first and second members and the stake and that such materials are not outside the scope of the present invention.

Preferably, the landscape timber connecting system of the present invention is used with standard 4"×4" construction lumber or pressure treated landscape timber or rounded landscape timber, preferably with 4"×4" construction lumber/landscape timber.

Having described the invention in detail and by reference to the drawings, it will be apparent that modification and variations are possible without departing from the scope of the invention as defined in the following claims.

What is claimed is:

1. For use with landscape timber, a landscape timber connecting system comprising:

a first member shaped to be attached to a landscape timber and having a first mating component and a first channel segment separate from said first mating component;

a second member shaped to be attached to a landscape timber and having a second mating component and a second channel segment separate from said second mating component, said second mating component being shaped to engage said first mating component such that engagement between said first and second mating components restricts movement between said first and second members to relative sideward movement only and wherein said first and second channel segments together form a common, substantially vertical channel between said first and second members; and a pin shaped to be inserted in said channel and protrude therefrom such that said first and second members are fixedly positioned relative to each other and are securable to the ground.

2. The landscape timber connecting system of claim 1 wherein said first and second members are substantially identical in shape.

3. The landscape timber connecting system of claim 1 wherein said pin is adapted to extend downwardly into ground beneath said system such that said pin anchors and fixes said system to said ground.

4. The landscape timber connecting system of claim 1 wherein said first and second members include means for attaching said members to said first and second landscape timbers, respectively.

5. The landscape timber connecting system of claim 4 wherein said means for attaching is selected from the group consisting of nails, screws, glue or combinations thereof.

6. The landscape timber connecting system of claim 5 wherein said means for attaching is at least one screw.

7. The landscape timber connecting system of claim 1 wherein said first and second mating components of each of said members include sidewardly fingers and rabbets, said rabbets being shaped to receive said fingers, such that engagement of said fingers with said rabbets limits said members to relative sideward movement.

8. The landscape timber connecting system of claim 1 wherein the first and second channel segments are semi-cylindrical in configuration.

9. A landscape timber connecting system comprising:
    a first member shaped to be attached to an end of a landscape timber, and having a first mating component and a first channel component separate from said first mating component;
    a second member shaped to be attached to an end of a landscape timber, and having a second mating component and a second channel component separate from said second mating component, said second mating component being shaped to engage said first mating component such that engagement between said first and second mating components restricts movement between said first and second members to relative sideward movement only and wherein said first and second channel components together form a common, substantially vertical channel between said first and second members; and
    a pin shaped to engage said first and second members through said common channel, such that said pin prevents disengagement of said first and second member from each other when positioned in said channel.

10. The landscape timber connecting system of claim 9 wherein said first and second members are substantially identical in shape.

11. The landscape timber connecting system of claim 9 wherein said pin is adapted to extend downwardly into said ground beneath said system such that said pin anchors and fixes said system in position.

12. The landscape timber connecting system of claim 9 wherein said first and second members include means for attaching said members to landscape timbers.

13. The landscape timber connecting system of claim 12 wherein said attaching means is selected from the group consisting of nails, screws, glue or combinations thereof.

14. The landscape timber connecting system of claim 13 wherein said means for attaching is at least one screw.

15. The landscape timber connecting system of claim 9 wherein said first and second mating components each include sidewardly projective fingers and rabbets, said rabbets being shaped to receive said fingers such that engagement of said fingers with said rabbets limits said members to relative sideward movement.

16. For use with landscape timber, a landscape timber connecting system comprising:
    a first member shaped to be attached to an end of a landscape timber, and having a first mating component and a first channel segment separate from said first mating component;
    a second member shaped to be attached to an end of a landscape timber, and having a second mating component and a second channel segment separate from said second mating component, said second mating component being shaped to engage with said first mating component such that engagement between said first and second mating components restricts movement between said first and second members to relative sideward movement only and wherein said first and second channel segments combine to form a common, substantially vertical channel between said first and second members;
    said first and second members being substantially identical in shape;
    said first and second members each including means for attaching said members to landscape timbers wherein said means for attaching is selected from the group consisting of nails, screws, glue or combinations thereof;
    said first and second mating components each including sidewardly-projecting fingers and rabbets, said rabbets shaped to receive said fingers in locking engagement; and
    a pin shaped to be inserted into said channel such that said pin locks said first and second members together and prevents relative sideward movement therebetween, said pin being shaped to extend downwardly from said channel into ground beneath said system such that said pin anchors and fixes said system to said ground.

17. The landscape timber connecting system of claim 16 wherein the first and second channel segments are semi-cylindrical in configuration.

18. For use with landscape timber, a landscape timber connecting system comprising:
    a first member having a first mounting block including a first mounting surface shaped to be attached to an end of a landscape timber, and a first hinge component having a first channel;
    a second member having a second mounting block including a second mounting surface shaped to be attached to an end of a landscape timber, and a second hinge component having a second channel, said first and second hinge components being combinable such that said first and second channels form a common, substantially vertical channel defining a pivot axis;
    wherein said first mounting block includes an arcuate cutout shaped to provide clearance for the second hinge component and said second mounting block includes an arcuate cutout shaped to provide clearance for the first hinge component when said first and second members are combined; and
    a hinge pin shaped to be inserted in said channel along said pivot axis such that said first and second members can be pivotally positioned relative to each other about said common pivot axis at a selected angle relative to each other.

19. The landscape timber connecting system of claim 18 wherein said first and second members are substantially identical in shape.

20. The landscape timber connecting system of claim 18 wherein said hinge pin is shaped to extend downwardly from said channel into ground beneath said system such that said hinge pin anchors and fixes said system to said ground.

21. The landscape timber connecting system of claim 18 wherein said first hinge component is shaped to slidably engage said second hinge component.

22. The landscape timber connecting system of claim 18 wherein said first and second hinge components each comprise a substantially vertical channel through which said hinge pin engages said first and second hinge components.

23. For use with landscape timber, a landscape timber connecting system comprising:

a first member including a first mounting block having a first mounting surface shaped to be attached to an end of a landscape timber, and a first hinge component having a substantially vertical channel therethrough;

a second member including a second mounting block having a second mounting surface shaped to be attached to an end of a landscape timber, and a second hinge component having a substantially vertical channel therethrough, said second hinge component being adapted to pivotally engage said first hinge component such that said channels form a common, substantially vertical channel defining a pivot axis;

said first and second members being substantially identical in configuration to each other;

said first and second mounting surfaces each including means for attachment to landscape timbers;

said mounting blocks being discrete from said hinge components;

said first and second mounting blocks and said first and second hinge components engaging to form said first and second members, wherein said first and second blocks each include a dovetail pin and said first and second hinge components each include a dovetail slot, said first and second blocks slidably mating with said first and second hinge components, respectively; and a hinge pin shaped to engage said first and second hinge components in said channel such that said first and second members can be pivotally positioned relative to each other about said common pivot axis at a selected angle relative to each other, wherein said hinge pin is adapted to extend downwardly into ground beneath said system such that said hinge pin anchors and fixes said system to said ground.

24. For use with landscape timber, a landscape timber connecting system comprising:

a first member having a first mounting surface shaped to be attached to an end of a landscape timber, and a first hinge component;

a second member having a second mounting surface shaped to be attached to an end of a landscape timber, and a second hinge component, wherein said first and second members each include a mounting block defining said first and second mounting surfaces, said mounting blocks being discrete from said hinge components;

said first and second hinge components being shaped to form a common, substantially vertical channel defining a pivot axis; and a hinge pin shaped to be inserted in said channel along said pivot axis such that said first and second members can be pivotally positioned relative to each other about said common pivot axis at a selected angle relative to each other.

25. For use with landscape timber, a landscape timber connecting system comprising:

a first member having a first mounting surface shaped to be attached to an end of a landscape timber, and a first hinge component;

a second member having a second mounting surface shaped to be attached to an end of a landscape timber, and a second hinge component, wherein said first and second members each include a mounting block defining said first and second mounting surfaces, said mounting blocks being discrete from said hinge components;

said mounting blocks each include a dovetail pin and said hinge components each include a dovetail slot, said dovetail pin and dovetail slot being shaped to limit relative movement between an associated mounting block and hinge component to sideward movement when said dovetail pin and dovetail slot are engaged;

said first and second hinge components being shaped to form a common, substantially vertical channel defining a pivot axis; and a hinge pin shaped to be inserted in said channel along said pivot axis such that said first and second members can be pivotally positioned relative to each other about said common pivot axis at a selected angle relative to each other.

* * * * *